(12) United States Patent
Igarashi

(10) Patent No.: US 8,449,179 B2
(45) Date of Patent: May 28, 2013

(54) TEMPERATURE DETECTION SYSTEM

(75) Inventor: Atsushi Igarashi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 349 days.

(21) Appl. No.: 12/974,956

(22) Filed: Dec. 21, 2010

(65) Prior Publication Data

US 2011/0158285 A1 Jun. 30, 2011

(30) Foreign Application Priority Data

Dec. 25, 2009 (JP) ................................. 2009-294656

(51) Int. Cl.
*G01K 7/01* (2006.01)

(52) U.S. Cl.
USPC ........... 374/178; 374/170; 374/137; 702/130; 327/513

(58) Field of Classification Search
None
See application file for complete search history.

(56) References Cited

U.S. PATENT DOCUMENTS

| | | | | |
|---|---|---|---|---|
| 4,445,636 A | * | 5/1984 | Peters | 236/20 R |
| 4,675,770 A | * | 6/1987 | Johansson | 361/18 |
| 6,674,623 B1 | | 1/2004 | Abe et al. | |
| 7,410,293 B1 | * | 8/2008 | Santurkar et al. | 374/178 |
| 7,657,772 B2 | * | 2/2010 | Clabes et al. | 713/500 |
| 8,118,483 B2 | * | 2/2012 | Cox | 374/170 |
| 8,237,515 B2 | * | 8/2012 | Keating | 331/176 |
| 2004/0019453 A1 | * | 1/2004 | Blakley | 702/130 |
| 2007/0150225 A1 | | 6/2007 | Boerstler et al. | 702/132 |
| 2011/0110396 A1 | * | 5/2011 | Grayson et al. | 374/178 |
| 2011/0268151 A1 | * | 11/2011 | Hadwen et al. | 374/141 |
| 2012/0096288 A1 | * | 4/2012 | Bates et al. | 713/320 |
| 2012/0219033 A1 | * | 8/2012 | Tanimura et al. | 374/1 |

FOREIGN PATENT DOCUMENTS

JP 2001-160042 A 6/2001

* cited by examiner

*Primary Examiner* — Gail Verbitsky

(74) *Attorney, Agent, or Firm* — Brinks Hofer Gilson & Lione

(57) ABSTRACT

Provided is a temperature detection system which is low in cost. The temperature detection system includes a plurality of temperature detection ICs (10) for detecting an abnormal temperature and a resistor (20). Each of the plurality of temperature detection ICs (10) includes a reference voltage terminal connected to an output terminal of one of the plurality of temperature detection ICs (10) located at a preceding stage. The resistor (20) is provided between an output terminal of one of the plurality of temperature detection ICs (10) located at the final stage and a ground terminal.

2 Claims, 4 Drawing Sheets

TEMPERATURE DETECTION SYSTEM

RELATED APPLICATIONS

This application claims priority under 35 U.S.C. §119 to Japanese Patent Application No. 2009-294656 filed on Dec. 25, 2009, the entire content of which is hereby incorporated by reference.

BACKGROUND OF THE INVENTION

1. Field of the Invention

The present invention relates to a temperature detection system including a plurality of temperature detection ICs.

2. Description of the Related Art

Japanese Patent Application Laid-open No. 2001-160042 discloses a circuit structure inside a microcomputer, in which a plurality of temperature detection circuits are provided in a plurality of circuit blocks and output terminals of the respective temperature detection circuits are connected to a single OR circuit. When a temperature detection circuit detects an abnormal temperature, an output signal from the temperature detection circuit becomes a high level, and hence an output signal from the OR circuit also becomes a high level. In response to the output signal from the OR circuit, predetermined control for protecting circuits from a high temperature is performed. In other words, when at least one temperature detection circuit detects the abnormal temperature, the predetermined control for protecting the circuits from the high temperature is performed.

There is a case where the control described above is also required for an inner portion of an electronic device. In this case, for example, a temperature detection system is proposed in which a plurality of temperature detection ICs are provided at predetermined positions of the electronic device and output terminals of the respective temperature detection ICs are connected to a single OR circuit.

However, the temperature detection system for the inner portion of the electronic device as described above requires an electronic part having a logic circuit function, for example, the OR circuit. Therefore, a cost of the temperature detection system is increased correspondingly.

SUMMARY OF THE INVENTION

The present invention has been made in view of the problem described above. An object of the present invention is to provide a temperature detection system which is low in cost.

In order to solve the problem described above, according to the present invention, there is provided a temperature detection system which includes a plurality of temperature detection ICs for detecting an abnormal temperature and a resistor. Each of the plurality of temperature detection ICs includes a reference voltage terminal connected to an output terminal of one of the plurality of temperature detection ICs located at a preceding stage. The resistor is provided between an output terminal of one of the plurality of temperature detection ICs located at the final stage and a ground terminal or a power supply terminal.

Further, according to the present invention, there is provided a temperature detection system which includes a plurality of temperature detection ICs for detecting an abnormal temperature and a resistor. Each of the plurality of temperature detection ICs includes an enable terminal which is provided for use in stopping an operation and connected to an output terminal of one of the plurality of temperature detection ICs located at a preceding stage. The resistor is provided between an output terminal of one of the plurality of temperature detection ICs located at the final stage and a ground terminal or a power supply terminal.

According to the present invention, it is unnecessary to provide an electronic part having a logic circuit function for the output terminals of the respective temperature detection ICs, and hence a cost of the temperature detection system is lowered.

DETAILED DESCRIPTION OF THE PREFERRED EMBODIMENT

Hereinafter, an embodiment of the present invention is described with reference to the attached drawings.

Figure 1:
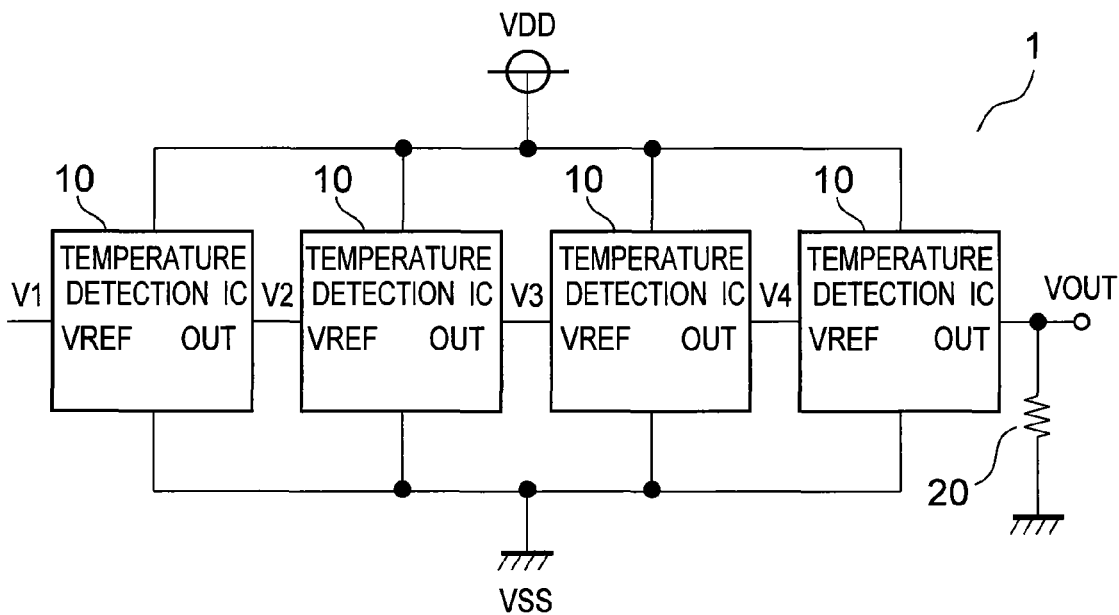
FIG. 1 is a block diagram illustrating a temperature detection system according to the present invention.

FIG. 1 is a block diagram illustrating a temperature detection system according to the present invention. A temperature detection system 1 includes a plurality of temperature detection ICs 10 and a resistor 20. The temperature detection system 1 further includes a power supply terminal, a ground terminal, and an output terminal.

Figure 2:
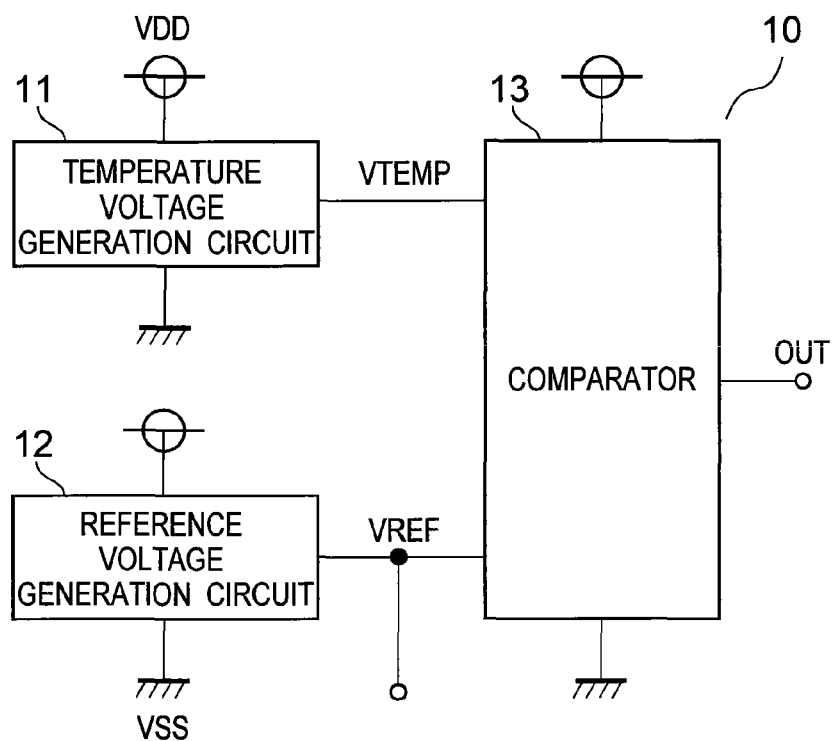
FIG. 2 is a block diagram illustrating a temperature detection IC in the present invention.

FIG. 2 is a block diagram illustrating a temperature detection IC in the present invention. Each of the temperature detection ICs 10 includes a temperature voltage generation circuit 11, a reference voltage generation circuit 12, and a comparator 13. The temperature detection IC 10 further includes a power supply terminal, a ground terminal, a reference voltage terminal, and an output terminal.

In each of the temperature detection ICs 10, the power supply terminal is connected to the power supply terminal of the temperature detection system, the ground terminal is connected to the ground terminal of the temperature detection system, and the reference voltage terminal is connected to the output terminal of the temperature detection IC 10 located at a preceding stage. The reference voltage terminal of the temperature detection IC 10 located at the first stage is not connected to any terminal. The output terminal of the temperature detection IC 10 located at the final stage is connected to the output terminal of the temperature detection system. The resistor 20 is provided between the ground terminal of the temperature detection system and the output terminal of the temperature detection IC 10 located at the final stage.

The comparator 13 includes a first input terminal connected to an output terminal of the temperature voltage generation circuit 11, a second input terminal connected to an output terminal of the reference voltage generation circuit 12 and the reference voltage terminal of the temperature detection IC 10, and an output terminal connected to the output terminal of the temperature detection IC 10.

In the temperature detection IC 10, the temperature voltage generation circuit 11 includes a PNP bipolar transistor, monitors a temperature, and generates a temperature voltage VTEMP corresponding to the monitored temperature. The reference voltage generation circuit 12 generates a reference voltage VREF set based on an abnormal temperature to be detected. The comparator 13 includes an open-drain type output circuit using a PMOS transistor (not shown) and compares the temperature voltage VTEMP with the reference voltage VREF. The PMOS transistor is turned on based on a result obtained by comparison, to change an output voltage OUT from a high-impedance state to a high level.

Figure 3:
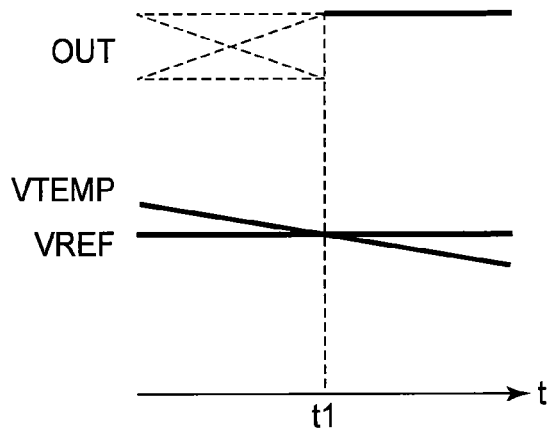
FIGS. 3A and 3B are time charts illustrating output voltages from the temperature detection IC illustrated in FIG. 2.
Figure 3:
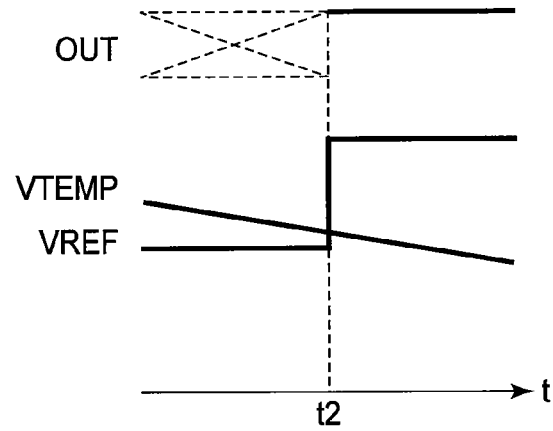

As illustrated in FIG. 3A, in a case where the temperature voltage generation circuit 11 has a characteristic in which the temperature voltage VTEMP lowers with an increase in temperature, when the temperature increases and thus the temperature voltage VTEMP lowers to become equal to or lower than the reference voltage VREF at a time t1, the output voltage OUT is changed from the high-impedance state to the high level. In other words, the temperature detection IC 10 detects the abnormal temperature. As illustrated in FIG. 3B, when a power supply voltage VDD is forcedly applied from an outside of the temperature detection IC 10 to the reference voltage terminal at a time t2, the temperature voltage VTEMP is forced to be a value equal to or lower than the reference voltage VREF. Therefore, the output voltage OUT is forcedly changed from the high-impedance state to the high level.

In the resistor 20, when the output terminal of the temperature detection IC 10 located at the final stage is in a high-impedance state, the output terminal is pulled down through the resistor 20.

Next, an operation of the temperature detection system is described.

Assume that the temperature detection IC 10 located at the second stage detects the abnormal temperature in a case where any one of the temperature detection ICs 10 detects the abnormal temperature. In this case, a voltage V1 corresponds to the reference voltage VREF of the temperature detection IC 10 located at the first stage.

The temperature detection IC 10 located at the first stage has not detected the abnormal temperature, and hence, during a period of t<t1 as illustrated in FIG. 3A, the output voltage OUT of the temperature detection IC 10 located at the first stage is in the high-impedance state. Therefore, a voltage V2 is the reference voltage VREF of the temperature detection IC 10 located at the second stage.

The temperature detection IC 10 located at the second stage has detected the abnormal temperature, and hence, during a period of t>t1 as illustrated in FIG. 3A, the output voltage OUT of the temperature detection IC 10 located at the second stage is in the high level. Therefore, a voltage V3 is in the high level.

The temperature detection IC 10 located at the third stage has not detected the abnormal temperature, but during a period of t>t2 as illustrated in FIG. 3B, the output voltage OUT of the temperature detection IC 10 located at the third stage is in the high level. Therefore, a voltage V4 is in the high level.

The temperature detection IC 10 located at the fourth stage has not detected the abnormal temperature, but during the period of t>t2 as illustrated in FIG. 3B, the output voltage OUT of the temperature detection IC 10 located at the fourth stage is in the high level. Therefore, an output voltage VOUT is in the high level.

When all the temperature detection ICs 10 have not detected the abnormal temperature, the voltage V1 is the reference voltage VREF of the temperature detection IC 10 located at the first stage.

The temperature detection ICs 10 located at the first to fourth stages have not detected the abnormal temperature, and hence, during the period of KU as illustrated in FIG. 3A, the output voltage OUT of each of the temperature detection ICs 10 located at the first to fourth stages is in the high-impedance state. Therefore, the voltages V2 to V4 are the reference voltages VREF of the temperature detection ICs 10 located at the second to fourth stages, respectively. The output voltage VOUT is pulled down through the resistor 20 and thus becomes the low level.

With this configuration, it is unnecessary to provide an electronic part having a logic circuit function for the output terminals of the respective temperature detection ICs 10, and hence a cost of the temperature detection system is lowered.

Although not illustrated, the comparator 13 in each of the temperature detection ICs 10 may include an open-drain type output circuit using an NMOS transistor and the resistor 20 may be provided between the power supply terminal and the output terminal of the temperature detection IC 10 located at the final stage. In a case where the temperature voltage generation circuit 11 has a characteristic in which the temperature voltage VTEMP increases with an increase in temperature, when the temperature increases and thus the temperature voltage VTEMP increases to become equal to or higher than the reference voltage VREF, the output voltage OUT is changed from the high-impedance state to a low level. In other words, the temperature detection IC 10 detects the abnormal temperature. When a ground voltage VSS is forcedly applied to the reference voltage terminal, the temperature voltage VTEMP is forced to be a value equal to or higher than the reference voltage VREF. Therefore, the output voltage OUT is forcedly changed from the high-impedance state to the low level.

Although not illustrated, the comparator 13 of the temperature detection IC 10 located at the final stage may include, instead of the open-drain type output circuit with which the output voltage OUT is changed from the high-impedance state to the high level, a CMOS type output circuit which operates to invert the output voltage OUT. The resistor 20 may be removed, which makes the resistor 20 unnecessary, and hence the number of parts of the temperature detection system reduces. Therefore, the temperature detection system is further lowered in cost.

Although not illustrated, the temperature detection IC 10 located at the final stage may contain the resistor 20. In this case, the number of parts of the temperature detection system reduces, and hence the temperature detection system is further lowered in cost.

The following circuit designs may be made appropriately on each of the temperature detection ICs 10: a temperature coefficient of the temperature voltage VTEMP; a voltage forcedly applied to the reference voltage terminal; respective points connected to the first and second input terminals (non-inverting input terminal and inverting input terminal) of the comparator 13; and which one of the PMOS and NMOS transistors is used for the open-drain type output circuit of the comparator 13, so that the output voltage OUT is forcedly changed from the high-impedance state to the high level or the low level when the temperature detection IC 10 detects the abnormal temperature.

The number of temperature detection ICs 10 is four, but the present invention is not limited to the four temperature detection ICs 10.

Figure 4:
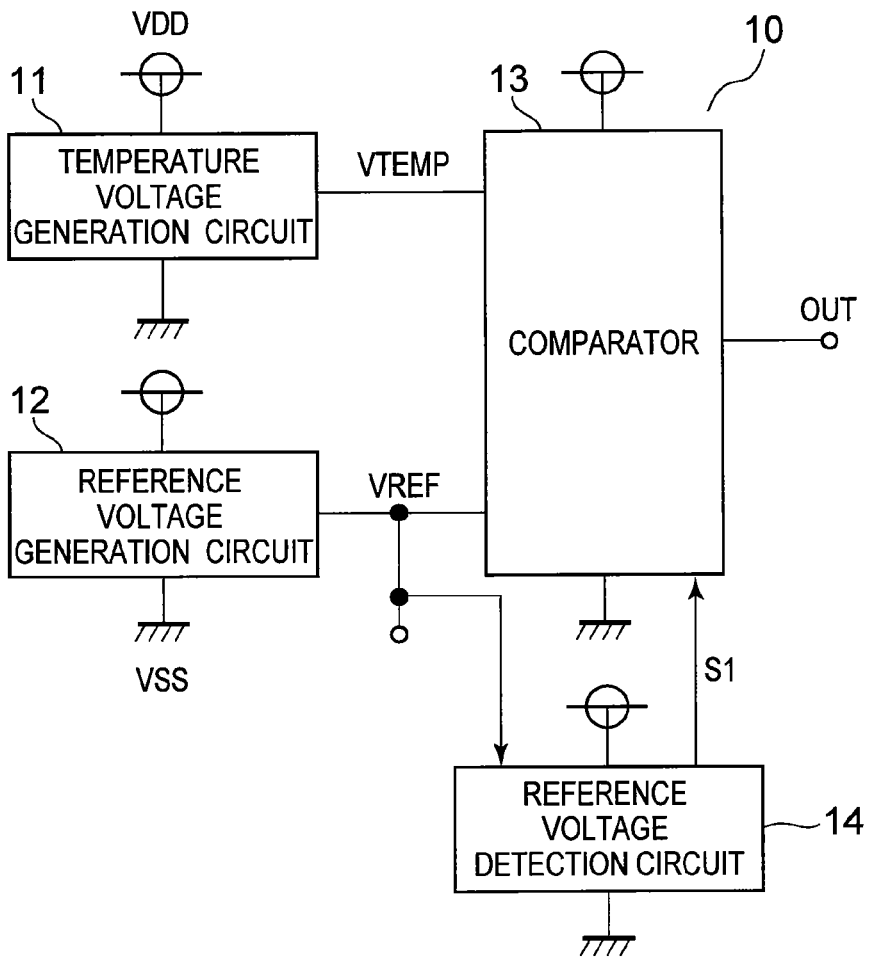
FIG. 4 is a block diagram illustrating another example of the temperature detection IC in the present invention.

FIG. 4 is a block diagram illustrating another example of the temperature detection IC in the present invention. As illustrated in FIG. 4, a reference voltage detection circuit 14 may be further provided. The reference voltage detection circuit 14 includes an input terminal connected to the reference voltage terminal and an output terminal connected to a control terminal of the comparator 13.

Figure 5:
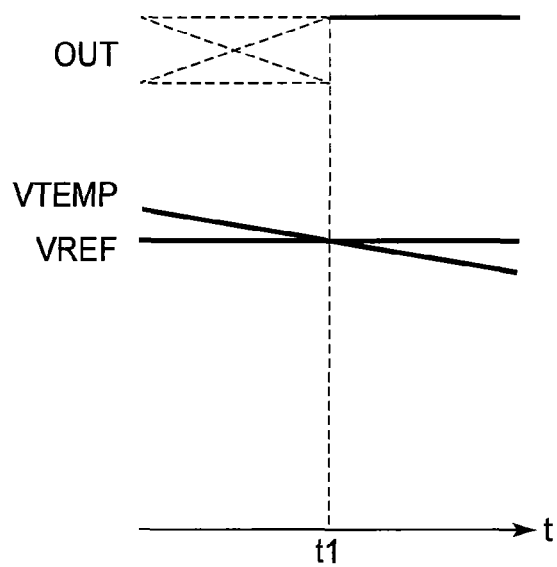
FIGS. 5A and 5B are time charts illustrating output voltages from the temperature detection IC illustrated in FIG. 4.
Figure 5:
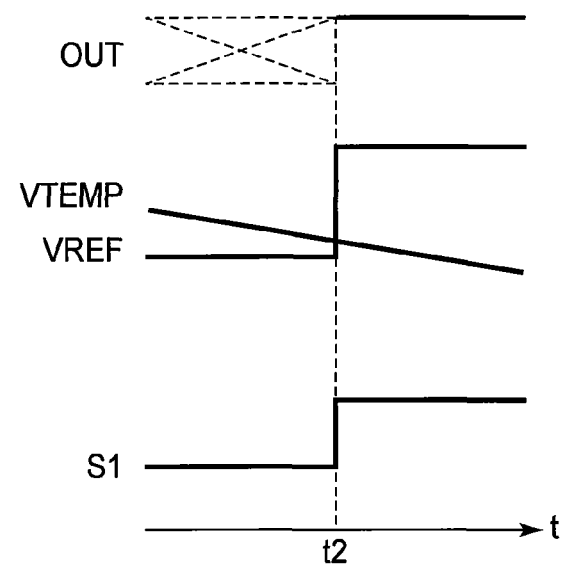

As illustrated in FIG. 5A, in the case where the temperature voltage generation circuit 11 has a characteristic in which the temperature voltage VTEMP lowers with an increase in temperature, when the temperature increases and thus the temperature voltage VTEMP lowers to become equal to or lower than the reference voltage VREF at the time t1, the output voltage OUT is changed from the high-impedance state to the high level. In other words, the temperature detection IC 10 detects the abnormal temperature. As illustrated in FIG. 5B, the power supply voltage VDD is forcedly applied to the reference voltage terminal at the time t2. Then, the reference voltage detection circuit 14 detects that the voltage of the reference voltage terminal reaches to the power supply voltage VDD, and forcedly sets a signal S1 to the high level. Therefore, the comparator 13 is controlled to forcedly change the output voltage OUT from the high-impedance state to the high level.

Figure 6:
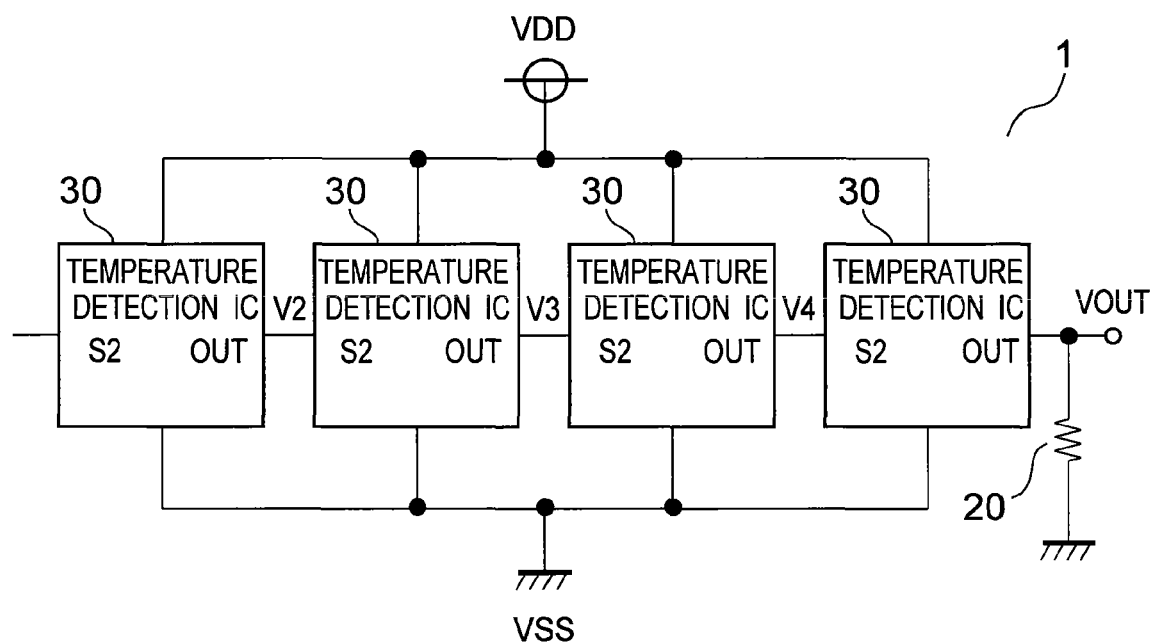
FIG. 6 is a block diagram illustrating another example of the temperature detection system according to the present invention.
Figure 7:
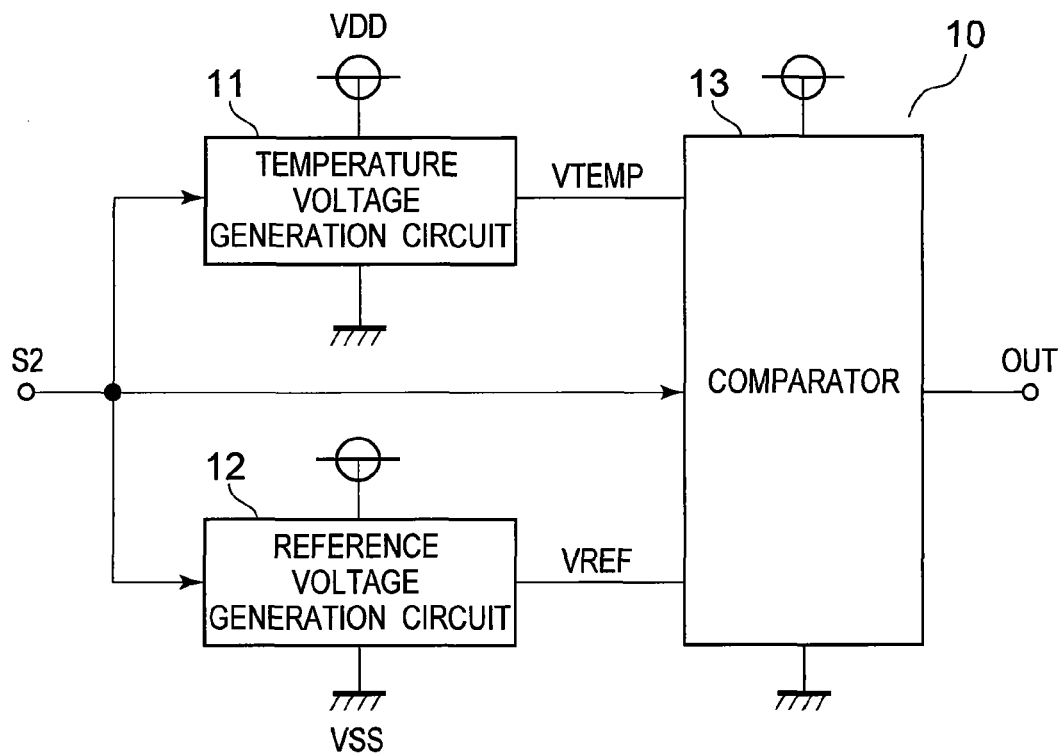
FIG. 7 is a block diagram illustrating still another example of the temperature detection IC in the present invention.

FIG. 6 is a block diagram illustrating another example of the temperature detection system according to the present invention. As illustrated in FIG. 6, the temperature detection ICs 10 may be changed to temperature detection ICs 30 and the reference voltage terminals may be changed to enable terminals. As illustrated in FIG. 7, in each of the temperature detection ICs 30, the reference terminal is removed and the enable terminal is provided. The enable terminal is connected to an enable terminal of each of the temperature voltage generation circuit 11, the reference voltage generation circuit 12, and the comparator 13.

The temperature detection IC 30 is circuit-designed so that, when an enable signal S2 applied to the enable terminal to stop an operation becomes a high level, the operation of the temperature detection IC 30 is stopped and the output voltage OUT is changed from the high-impedance state to the high level.

Figure 8:
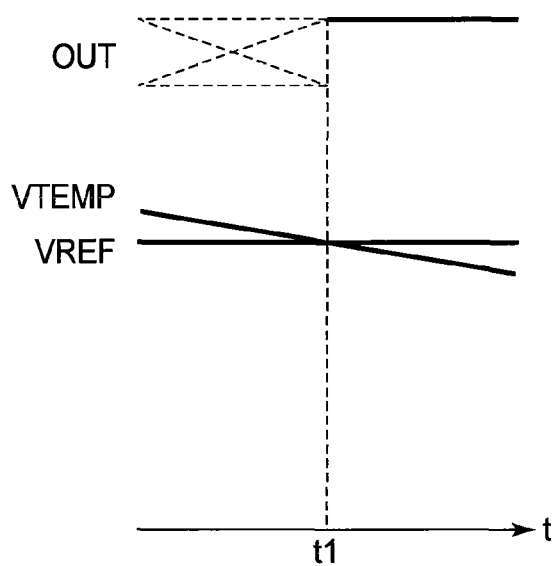
FIGS. 8A and 8B are time charts illustrating output voltages from the temperature detection IC illustrated in FIG. 7.
Figure 8:
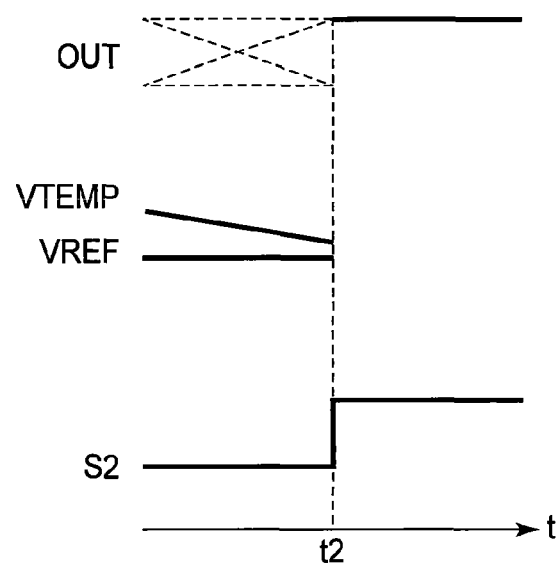

In this case, as illustrated in FIG. 8A, in the case where the temperature voltage generation circuit 11 has a characteristic in which the temperature voltage VTEMP lowers with an increase in temperature, when the temperature increases and thus the temperature voltage VTEMP lowers to become equal to or lower than the reference voltage VREF at the time t1, the output voltage OUT is changed from the high-impedance state to the high level. In other words, the temperature detection IC 30 detects the abnormal temperature. As illustrated in FIG. 8B, when the enable signal S2 applied to the enable terminal is in the high level at the time t2, the temperature voltage generation circuit 11, the reference voltage generation circuit 12, and the comparator 13 stop the operation. In other words, the temperature detection IC 30 stops the operation. The output voltage of the comparator 13 at the time when the operation is stopped is changed from the high-impedance state to the high level, and hence the output voltage OUT is changed from the high-impedance state to the high level.

In this case, although not illustrated, the comparator 13 of each of the temperature detection ICs 30 may include, instead of the open-drain type output circuit, the CMOS type output circuit. The resistor 20 may be removed and the enable terminal of the temperature detection IC 30 located at the first stage may be connected to the ground terminal, which makes the resistor 20 unnecessary, and hence the number of parts of temperature detection system reduces. Therefore, the temperature detection system is further lowered in cost.

What is claimed is:

1. A temperature detection system, comprising a plurality of temperature detection ICs,
    wherein each of the plurality of temperature detection ICs includes:
        a temperature voltage generation circuit for generating a temperature voltage corresponding to a temperature;
        a reference voltage generation circuit for generating a reference voltage;
        a comparator for inputting the temperature voltage and the reference voltage to compare the temperature voltage with the reference voltage, and outputting a comparison result to an output terminal of the each of the plurality of temperature detection ICs; and
        a reference voltage terminal connected to an input terminal of the comparator to which the reference voltage is input, and
    wherein the output terminal of the each of the plurality of temperature detection ICs is connected to the reference voltage terminal of one of the plurality of temperature detection ICs located at a subsequent stage and has a high impedance during no detection.

2. A temperature detection system, comprising a plurality of temperature detection ICs,
    wherein each of the plurality of temperature detection ICs includes:
        a temperature voltage generation circuit for generating a temperature voltage corresponding to a temperature;
        a reference voltage generation circuit for generating a reference voltage;
        a comparator for inputting the temperature voltage and the reference voltage to compare the temperature voltage with the reference voltage, and outputting a comparison result to an output terminal of the each of the plurality of temperature detection ICs; and
        an enable terminal for forcedly making a state of the each of the plurality of temperature detection ICs a detection state when an enable signal is input, and
    wherein the output terminal of the each of the plurality of temperature detection ICs is connected to the enable terminal of one of the plurality of temperature detection ICs located at a subsequent stage.

* * * * *